United States Patent
Hupka et al.

(10) Patent No.: US 12,037,657 B2
(45) Date of Patent: Jul. 16, 2024

(54) CRUSHING METHOD FOR GALVANIC CELLS WITH HIGH ENERGY DENSITIES

(71) Applicant: REGAIN Sp. z o.o., Wejherowo (PL)

(72) Inventors: Łukasz Hupka, Reda (PL); Jan Hupka, Gdańsk (PL)

(73) Assignee: REGAIN SP. Z O.O. (PL)

( * ) Notice: Subject to any disclaimer, the term of this patent is extended or adjusted under 35 U.S.C. 154(b) by 466 days.

(21) Appl. No.: 17/421,033

(22) PCT Filed: Dec. 30, 2019

(86) PCT No.: PCT/PL2019/000118
§ 371 (c)(1),
(2) Date: Jul. 7, 2021

(87) PCT Pub. No.: WO2020/145829
PCT Pub. Date: Jul. 16, 2020

(65) Prior Publication Data
US 2022/0056553 A1  Feb. 24, 2022

(30) Foreign Application Priority Data
Jan. 8, 2019  (PL) .......................................... 428517

(51) Int. Cl.
| B02C 19/18 | (2006.01) |
| B02C 23/00 | (2006.01) |
| C22B 1/00 | (2006.01) |
| H01M 6/52 | (2006.01) |
| H01M 10/54 | (2006.01) |

(52) U.S. Cl.
CPC ............ *C22B 1/005* (2013.01); *B02C 19/186* (2013.01); *B02C 23/00* (2013.01); *H01M 6/52* (2013.01); *H01M 10/54* (2013.01)

(58) Field of Classification Search
None
See application file for complete search history.

(56) References Cited

U.S. PATENT DOCUMENTS

| 5,345,033 A | 9/1994 | McLaughlin ................. 588/249 |
| 5,888,463 A | 3/1999 | McLaughlin et al. ..... 423/179.5 |
| 6,524,737 B1 * | 2/2003 | Tanii ..................... H01M 10/54 |
| | | 429/49 |
| 7,169,206 B2 | 1/2007 | Cheret et al. ................ 75/10.19 |
| 7,820,317 B2 | 10/2010 | Tedjar et al. ................... 429/49 |
| 7,833,646 B2 | 11/2010 | Zenger et al. .................. 429/49 |
| 9,957,099 B2 * | 5/2018 | White ................ B65D 81/3862 |
| 2004/0028585 A1 * | 2/2004 | Cardarelli ............. H01M 10/54 |
| | | 423/66 |
| 2021/0359312 A1 * | 11/2021 | Weber ................... H01M 10/54 |

FOREIGN PATENT DOCUMENTS

| CH | 681 401 A5 | 3/1993 | |
| CN | 108525817 A | 9/2018 | |
| CN | 108777332 A | * 11/2018 | ............ H01M 10/54 |
| CN | 108777332 A | 11/2018 | |
| EP | 1 041 649 A1 | 10/2000 | |
| WO | WO 2005/101564 A1 | 10/2005 | |

OTHER PUBLICATIONS

International Search Report mailed Mar. 27, 2020 in corresponding PCT International Application No. PCT/PL2019/000118.
Written Opinion mailed Mar. 27, 2020 in corresponding PCT International Application No. PCT/PL2019/000118.

* cited by examiner

*Primary Examiner* — Bobby Yeonjin Kim
*Assistant Examiner* — Jared O Brown
(74) *Attorney, Agent, or Firm* — OSTROLENK FABER LLP

(57) ABSTRACT

A crushing method for galvanic cells with high energy densities in which a mixture of used cells is placed inside an insulated container and carbon dioxide as dry ice is added to this mixture as a cooling medium. Dry ice is added to the mixture of used galvanic cells at a volumetric ration of 0.5:1 to 2:1. The mixture of used cells with dry ice is cooled down from −20° C. to −50° C. and is subsequently fed to the crushing device and subjected to crushing. A stream of used galvanic cells and a stream of dry ice granules are preferably fed simultaneously to the insulated container of the crushing device, and this mixture is forwarded to the working part of the crushing device. At the end of galvanic cell crushing, the mixture of air and gaseous carbon dioxide is returned to the insulated container.

7 Claims, No Drawings

CRUSHING METHOD FOR GALVANIC CELLS WITH HIGH ENERGY DENSITIES

CROSS-REFERENCE TO RELATED APPLICATIONS

The present application is a 35 U.S.C. §§ 371 national phase conversion of International Application No. PCT/PL2019/000118, filed Dec. 30, 2019, which claims priority to Polish Patent Application No. P.428517, filed Jan. 8, 2019, the contents of both of which are incorporated herein by reference. The PCT International Application was published in the English language.

TECHNICAL FIELD

The subject of the invention is a crushing method for galvanic cells with high energy densities, commonly used as power supply sources in electric and electronic devices.

BACKGROUND OF THE INVENTION

The term cell should be understood in this patent disclosure as a basic device intended for energy storage, including electrodes, a separator and an electrolyte. Basic cells are usually combined into cell batteries, however, said cells are usually sold individually and have cylindrical, flat or pellet-like shape and are used as power supply sources for devices and instruments, e.g. medical instruments, electric motors in vehicles, ships, laptops, smartphones, power tools, remote control devices and other commonly used devices. They usually have the form of rechargeable batteries. Their lifetime is very long and covers years. Such cells include mostly lithium-based cells.

An example lithium-ion cell may have various shapes and usually has the form of a cylindrical cell with an approximate diameter of 18 mm and an approximate length of 65 mm (the so-called cell 18650) or 21 mm diameter and 70 mm length (the so-called cell 21700). Such cells may reach the capacity of ca. 3,000 mAh-6,000 mAh, however, the current they provide may depend on the cell design. The most popular version of this cell type is a lithium-cobalt design, however, manganese or nickel in various qualitative and quantitative compositions may be used instead of cobalt. Disposal of used products of this type becomes problematic.

Because of the design of high energy density cells, they require pre-processing, including recovery of valuable raw materials for reuse. The pre-processing usually includes a number of steps, such as cell discharging, disassembly and separation from the packaging, as well as separation of cell elements, such as the anode, the cathode, the separator, the electrolyte or the binder. This is performed by separating the cells through cutting, crushing, detailed separation and/or sieving the crushed material. Because of the levels of toxic materials, a range of hazards related to opening of such high energy density cells exists. They result mainly from the toxicity of cell components and the violent occurrence of potential chemical and electrochemical reactions, flammability and self-ignition of numerous components.

The recycling process described in the patent disclosure U.S. Pat. No. 7,169,206 proposes a disposal technology based on pyrolysis. This known solution proposes melting, resulting in metals obtained as an alloy of cobalt, copper, nickel and iron. Other valuable metals, such as lithium, manganese and aluminium, are not recovered. The process according to this known solution requires significant thermal energy and an advanced purification system for toxic flue gases.

Other patent publications, EP 1041649, WO 2005/101564 and U.S. Pat. No. 7,833,646 recommend initial cell disassembly and replacement of ambient air with inert gases or vacuum. Such solutions, however, require gas-tight insulation, as well as strict qualitative and quantitative control of the composition of inert gases in the reaction chamber. This translated into a more complex process, higher costs and more complex loading and unloading of the reaction chamber.

The task of the invention is to develop an environment-friendly, economic, energy saving, non-hermetic and safe method of opening and crushing said high energy density cells and facilitating subsequent disposal of cell components. An example application of the commonly used type 18650 lithium-ion cells is their use in drives of electric vehicles, where thousands of such cells are combined into a battery powering the vehicle.

A solution known from the patent disclosure U.S. Pat. No. 5,345,033 proposes neutralisation of the aforementioned hazardous materials at low and cryogenic temperatures.

Another solution known from the patent disclosure U.S. Pat. No. 5,888,463 foresees crushing of lithium cells at low temperatures as the first step. According to this solution, cells are frozen before crushing, at −196° C. The mixture is collected in a basic solution in order to neutralise the acids separating during crushing and to hydrolyse organic solvents. Lithium salts, such as lithium sulphate or chloride, are separated from metal and plastic residues during sieving, by adding sodium carbonate in order to precipitate lithium as carbonate, before purification and re-crystallisation.

Another solution known from the international patent application WO 2005/101564 proposes processing of all types of anode cells and lithium cells in a hydrometallurgic process at room temperature. This technology includes dry crushing at room temperature, in ambient atmosphere, followed by magnetic separation, densymetric sorting and hydrolysis in order to recover at least lithium as carbonate or lithium phosphate, an anion of the aforementioned salt and a concentrate based on at least one metal of the aforementioned cathode. Crushing according to this known solution is performed using two mills connected in a series, with the first mill rotating with a maximum speed of 11 rpm, and the second mill up to 90 rpm. The first mill of this known solution is a shearing mill, whereas the second mill is a rotor mill. The mixture obtained during crushing is processed using a device combining sieving down to 3 mm, followed by sieving down to 500 micrometres and high induction separating magnetisation. This method separates individual fractions from the mixture.

Another known solution is presented in the patent disclosure CH 681401. According to this known solution, cells are separated according to their sizes in the first stage, using optoelectronic identification and separation, and automatic sorting by mass. The cells are separated according to their sizes. The cells are cooled down from −100° C. to −190° C. using liquid nitrogen or other, liquefied gases. At such temperatures the cells are frozen and brittle, thus easier to crush. After the initial separation, the cells are subsequently separated in an impact mill or another type of mill and separated into fractions. One fraction includes coatings or shells, the other part contains the contents of cell interior. The coating fraction is separated into magnetic scrap and a non-magnetic fraction using magnetic separation. The magnetic scrap contains parts with iron. Components of the non-magnetic fraction are further separated using air classification, according to their density. This allows plastics to be separated. Non-magnetic scrap containing zinc, molybdenum, copper and lead remains. The next step includes dissolution in sulphuric acid. Substances soluble in sulphuric acid are dissolved, while the insoluble substances form a residue. Manganese ($Mn^{2+}$), nickel ($Ni^{2+}$), zinc ($Zn^{2+}$), cadmium ($Cd^{2+}$), mercury ($Hg^{2+}$), lithium ($Li^+$), potassium ($K^+$) and sodium ($Na^+$) are dissolved as ions. The residue contains carbon, partially as graphite, manganese dioxide ($MnO_2$), silicon dioxide ($SiO_2$), aluminium trioxide ($Al_2O_3$), as well as cadmium, mercury, copper and lead compounds. Individual elements are separated from sulphuric acid using selective ion exchangers. The obtained eluate is electrolysed. Manganese is separated on the anode, the other metals deposit on the cathode. Sulphuric acid is regenerated. The residue, insoluble in sulphuric acid, is dissolved in nitric acid, the residue is again separated by gravity and subsequently separated into three fractions. The first fraction contains manganese dioxide, the second fraction contains carbon, partially as graphite, while the third fraction includes silicon dioxide ($SiO_2$) and aluminium trioxide ($Al_2O_3$). Nitric acid is regenerated.

SUMMARY OF THE INVENTION

The task of the invention is to improve the stage of safe crushing of the described cells, whilst creating favourable conditions for subsequent operations on the crushed cells, and to provide protection against ignition.

This task was solved in the claimed manner.

According to the invention, the crushing method for galvanic cells with high energy densities is characterised in that used batteries are stored and crushed in a mixture with solid carbon dioxide, namely with dry ice. The mixture of used cells is placed in an insulated container and a cooling medium is added to such a mixture, thus decreasing the temperature of used cells. The cooled mixture of used cells and of the cooling medium is then fed to a crushing device including a thermally insulated container.

According to the invention, the crushing method for galvanic cells is characterised in that the cooling medium is carbon dioxide in the form of dry ice, added to the mixture of used galvanic cells at a volumetric ratio of 0.1:1 to 2:1, and the mixture of used cells with dry ice is cooled down from −20° C. to −50° C., and the mixture of used cells with dry ice is subsequently fed to the crushing device.

Dry ice according to the invention is preferably a dry ice granulate, with granule size of 5 mm to 100 mm.

In a preferred embodiment of the invention, dry ice may be characterised by granulate size of 14 mm to 18 mm.

Alternate layers of dry ice and used cells are placed during placement of used galvanic cells in the insulated container of the crushing device in the preferred embodiment of the solution according to the invention.

In another, preferred embodiment of the invention, a stream of used galvanic cells and a stream of dry ice granules are fed simultaneously to the insulated container of the crushing device, and to the working part of the crushing device.

At the end of galvanic cell crushing, the mixture of air and carbon dioxide is preferably returned to the insulated container of the crushing device.

The mixture of air and carbon dioxide is returned to the insulated container with galvanic cells and the dry ice of the crushing device, preferably at a linear rate of 10 m/h to 36 m/h.

The solution according to the invention proposes decreasing the temperature of the mixture of used galvanic cells subjected to crushing by adding granules of dry ice, namely of solidified carbon dioxide. This additive is a chemically inert additive in the case of components of such crushed cells. At the same time, the subliming dry ice is able to maintain the required, uniformly decreased temperature for a longer time, leading to a deep decrease of temperature of the crushed cells. Chemicals able to form flammable or toxic mixtures in some cases evolve during cell crushing. The environment of gaseous carbon dioxide formed during dry ice sublimation prevents conditions facilitating ignition of such a gas mixture under such conditions. Additionally, the solution according to the invention proposes returning the cool mixture of carbon dioxide and air to the insulated container of the crushing device, resulting in an initial decrease of temperature in this container while feeding new batches of used galvanic cells for crushing. The proposed addition of dry ice thus resulted in a temperature decrease inside the insulated container, maintained uniformly low temperature during sublimation, mitigated fire hazard, prevented mission of harmful chemicals into the atmosphere and allowed the cool, gaseous carbon dioxide to be directed to the insulated battery container, the crushing device and the subsequent steps of material processing intended to separate the desired fractions.

DESCRIPTION OF PREFERRED EMBODIMENTS

The subject of the invention is presented below as embodiments.

A mixture of used cells is placed in the insulated container and a cooling medium is added to this mixture, the temperature of used cells is decreased and the cooled mixture of used cells and of the cooling medium is then fed to the working unit of the crushing device. The cooling medium in this embodiment is carbon dioxide in the form of dry ice, added to the mixture of used galvanic cells at a volumetric ratio of 0.5:1. Next, the mixture of used cells and dry ice is cooled to −20° C., followed by feeding the mixture of used cells and dry ice to the working unit of the crushing device.

Dry ice in this embodiment is a granulate with granule size of 1 mm. In other embodiments, dry ice may be used as granulate with granule size up to 18 mm.

Alternate, 5 cm thick layers of dry ice and used cells are placed in the insulated container of the crushing device during placement of used galvanic cells in the insulated container.

In another embodiment, a stream of used galvanic cells and a stream of dry ice granules are fed simultaneously to the insulated container of the crushing device.

At the end of galvanic cell crushing, the mixture of air and carbon dioxide is returned to the insulated container of the crushing device.

In this embodiment, the mixture of air and carbon dioxide is returned from the crushing zone to the insulated container at an average, linear rate of 10 m/h.

In the next embodiment, a mixture of used cells is placed in the insulated container and a cooling medium is added to this mixture, the temperature of used cells is decreased and the cooled mixture of used cells and of the cooling medium is then fed to the working unit of the crushing device. The cooling medium in the form of dry ice is added to the mixture of used galvanic cells in this embodiment at a volumetric ratio of 2:1, and the mixture of used cells with said dry ice is cooled down to −50° C., and the mixture of used cells and dry ice is fed to the working unit of the crushing device.

In this embodiment, dry ice is a granulate with granule size of 100 mm. In this embodiment, alternate, 20 cm thick layers of dry ice and 10 cm thick layers of used cells are placed in the insulated container of the crushing device during placement of used galvanic cells in the insulated container.

In this embodiment, the mixture of air and carbon dioxide is returned from the crushing zone to the insulated container at an average, linear rate of 36 m/h.

According to another embodiment of the invention, the mixture of used cells is placed in an insulated container of the crushing device, in this embodiment in a container of a known, double shaft, slow rotation "shredder" crushing machine with cutting discs with a diameter of 260-360 mm and thickness of 3 to 15 mm. The mixture of used cells of the 18650 and/or 2170 type is simultaneously cooled in this container using recirculated mixture of cold carbon dioxide and air and/or by adding dry ice. In this embodiment, dry ice is added crushed into granules with diameter of 14 mm to 18 mm, in a volumetric ratio to used cells from 1:100 to 1:10. The mixture with dry ice decreases the temperature of recycled cells. The mixture of used cells and dry ice is stored in the thermally insulated container of the crushing device by the technologically required time, usually no longer than 15 minutes, in order to decrease the cell temperature to at least −20° C. Then, the chute leading from the insulated container to the working unit of the crushing device is opened. Inside the working unit of the double shaft shredder, the initially cooled mixture of used cells is crushed into particles with size between 2 mm and 8 mm with additional dry ice, wherein the material temperature reaches −20° C. to −50° C. Such crushed cells are directed to separation and possible further crushing, where the known process of sorting into individual, recoverable fractions takes place.

The mixture of used cells with dry ice is conditioned to the crushing temperature in two stages: inside the insulated container, for 15 minutes, to −20° C., and during the crushing itself, to between −30° C. and −50° C.

In another embodiment of the invention, layers of used galvanic cells are placed inside the insulated container of the crushing device loosely packed, alternating with dry ice layers, in the respective, initial volumetric ratio of 7:1.

After crushing of galvanic cells in the double shaft shredder to fractions listed for this embodiment (the initial volumetric ratio of 7:1), the mixture of air and carbon dioxide is directed to the space of cutting discs of the double shaft shredder and to subsequent operations or unit processes of battery recycling. This mixture is fed from the space of cutting discs of the disc mill to the insulated container at the average linear rate of 20 m/h.

The invention claimed is:

1. A method for processing used galvanic cells with high energy densities, comprising:
    placing a mixture of the used galvanic cells inside an insulated container;
    adding a cooling medium to the mixture to reduce the temperature of the used galvanic cells; and
    subsequently feeding the mixture and the cooling medium to a working unit of a crushing device;
    wherein the cooling medium is carbon dioxide as dry ice;
    wherein the mixture is cooled down to a temperature of −20° C. to −50° C.; and
    wherein a volumetric ratio of the used galvanic cells to the dry ice is between 0.5:1 and 2:1.

2. The method according to claim 1, wherein said dry ice is a granulate, with granule size of 1 mm to 100 mm.

3. The method according to claim 1, wherein said dry ice is a granulate, with granule size of 14 mm to 18 mm.

4. The method according to claim 1, wherein alternate layers of dry ice and of the used galvanic cells are placed in an insulated container of the crushing device during the placement of the used galvanic cells.

5. The method according to claim 1, wherein a stream of the used galvanic cells and a stream of dry ice granules are fed simultaneously to an insulated container of the crushing device.

6. The method according to claim 1, wherein after the crushing of the used galvanic cells, a mixture of air and carbon dioxide is returned to an insulated container of the crushing device.

7. The method according to claim 6, wherein the mixture of air and carbon dioxide is returned with an average linear rate of 10 m/h to 36 m/h.

* * * * *